US012764730B2

(12) United States Patent
Yang

(10) Patent No.: US 12,764,730 B2
(45) Date of Patent: Oct. 13, 2026

(54) BEAM INDICATION METHOD AND DEVICE

(71) Applicant: VIVO MOBILE COMMUNICATION CO., LTD., Dongguan (CN)

(72) Inventor: Yu Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 428 days.

(21) Appl. No.: 18/220,895

(22) Filed: Jul. 12, 2023

(65) Prior Publication Data

US 2023/0379897 A1 Nov. 23, 2023

Related U.S. Application Data

(63) Continuation of application No. PCT/CN2022/071646, filed on Jan. 12, 2022.

(30) Foreign Application Priority Data

Jan. 13, 2021 (CN) ......................... 202110044412.5

(51) Int. Cl.
*H04W 72/044* (2023.01)
*H04L 5/00* (2006.01)
*H04W 72/231* (2023.01)

(52) U.S. Cl.
CPC ........... *H04W 72/046* (2013.01); *H04L 5/005* (2013.01); *H04W 72/231* (2023.01)

(58) Field of Classification Search
CPC . H04W 72/046; H04W 72/231; H04W 72/23; H04W 72/21; H04W 72/232; H04W 72/0446; H04W 72/1268; H04L 5/005; H04L 5/0035; H04L 5/0044; H04L 5/0048; H04L 5/0094; H04L 1/1812; H04L 1/1822; H04L 27/2663; H04B 7/0695; H04B 7/0456; H04B 7/0602; H04B 7/06952; H04B 7/088
See application file for complete search history.

(56) References Cited

U.S. PATENT DOCUMENTS

| | | | | |
|---|---|---|---|---|
| 2019/0132061 | A1* | 5/2019 | Xin | H04L 27/2663 |
| 2020/0413390 | A1 | 12/2020 | Rahman et al. | |

(Continued)

FOREIGN PATENT DOCUMENTS

| | | | |
|---|---|---|---|
| CN | 110958693 | A | 4/2020 |
| CN | 111615195 | A | 9/2020 |
| WO | 2020006277 | A1 | 1/2020 |

OTHER PUBLICATIONS

Futurewei, "Enhancement on multi-beam operation", 3GPP TSG RAN WG1 Meeting #103-e, e-Meeting, Oct. 26-Nov. 13, 2020, R1-2007546.

(Continued)

*Primary Examiner* — Kiet Tang
(74) *Attorney, Agent, or Firm* — The Webb Law Firm

(57) ABSTRACT

A beam indication method includes receiving, by a terminal, a first signaling, the first signaling being used for indicating a TCI state, the TCI state being used for indicating a common beam of at least two channels or reference signals; and transmitting feedback information of the first signaling, the feedback information of the first signaling including one of feedback information of a first target channel, a second target channel and a target reference signal.

20 Claims, 4 Drawing Sheets

(56) References Cited

U.S. PATENT DOCUMENTS

| | | | | |
|---|---|---|---|---|
| 2021/0185647 | A1* | 6/2021 | Rahman | H04W 72/23 |
| 2021/0321373 | A1* | 10/2021 | Rahman | H04B 7/088 |
| 2022/0029692 | A1 | 1/2022 | Yang et al. | |

OTHER PUBLICATIONS

Samsung, "Multi-beam enhancements", 3GPP TSG RAN WG1 #103-e, e-Meeting, Oct. 26-Nov. 13, 2020, R1-2008148.

Vivo, "Discussion on multi-beam enhancement", 3GPP TSG RAN WG1 #102-e, e-Meeting, Aug. 17-28, 2020, R1-2005363.

ZTE, "Enhancements on Multi-beam Operation", 3GPP TSG RAN WG1 Meeting #103-e, e-Meeting, Oct. 26-Nov. 13, 2020, R1-2007763.

Huawei et al., "Introduction of capability bit for multi-CC simultaneously TCI activation with multi-TRP", 3GPP TSG-RAN WG2 Meeting #112-e, Electronic Meeting, Nov. 2-13, 2020, R2-20107983.

* cited by examiner

BEAM INDICATION METHOD AND DEVICE

CROSS-REFERENCE TO RELATED APPLICATIONS

This application is a Bypass Continuation Application of International Application No. PCT/CN2022/071646 filed Jan. 12, 2022, and claims priority to Chinese Patent Application No. 202110044412.5 filed Jan. 13, 2021, the disclosures of which are hereby incorporated by reference in their entireties.

BACKGROUND OF THE INVENTION

Field of the Invention

This application belongs to the field of communications technology and relates to a beam indication method and a device. The device may include a terminal, a network side device, a beam indication apparatus, etc.

Description of Related Art

The network side device can perform beam indication for downlink and uplink channels or reference signals, so as to establish a beam link between the network side device and a terminal to achieve the transmission of channels or reference signals. Beam indication mechanisms for various channels and reference signals in related technologies are different, which will require large signaling overhead.

SUMMARY OF THE INVENTION

Embodiments of this application provide a beam indication method and a device.

In a first aspect, this application provides a beam indication method, including: receiving, by a terminal, a first signaling, the first signaling being used for indicating a TCI state, the TCI state being used for indicating a common beam of at least two channels or reference signals; and transmitting feedback information of the first signaling, the feedback information of the first signaling including one of: feedback information of a first target channel, a second target channel and a target reference signal.

In a second aspect, this application provides a beam indication method, including: transmitting, by a network side device, a first signaling, the first signaling being used for indicating a TCI state, the TCI state being used for indicating a common beam of at least two channels or reference signals; and receiving feedback information of the first signaling, the feedback information of the first signaling including one of: feedback information of a first target channel, a second target channel and a target reference signal.

In a third aspect, this application provides a beam indication apparatus, including a receiving module configured to receive a first signaling, the first signaling being used for indicating a TCI state, the TCI state being used for indicating a common beam of at least two channels or reference signals; and a transmitting module configured to transmit feedback information of the first signaling, the feedback information of the first signaling including one of: feedback information of a first target channel, a second target channel and a target reference signal.

In a fourth aspect, this application provides a beam indication apparatus, including: a transmitting module configured to transmit a first signaling, the first signaling being used for indicating a TCI state, the TCI state being used for indicating a common beam of at least two channels or reference signals; and a receiving module configured to receive feedback information of the first signaling, the feedback information of the first signaling including one of: feedback information of a first target channel, a second target channel and a target reference signal.

In a fifth aspect, this application provides a terminal including a processor, a memory and a program or instruction stored in the memory and executable on the processor, the program or instruction, when executed by the processor, implementing the beam indication method in the first aspect.

In a sixth aspect, this application provides a network side device including a processor, a memory and a program or instruction stored in the memory and executable on the processor, the program or instruction, when executed by the processor, implementing the beam indication method in the second aspect.

In a seventh aspect, this application provides a non-transitory readable storage medium storing a program or instruction, the program or instruction, when executed by a processor, implementing the beam indication method in the first aspect or the beam indication method in the second aspect.

In an eighth aspect, this application provides a computer program product including a processor, a memory and a program or instruction stored in the memory and executable on the processor, the program or instruction, when executed by the processor, implementing the beam indication method in the first aspect or the beam indication method in the second aspect.

In a ninth aspect, this application provides a chip including a processor and a communication interface coupled to the processor, the processor being configured to run a program or instruction to implement the beam indication method in the first aspect or the beam indication method in the second aspect.

DESCRIPTION OF THE INVENTION

The technical solutions in the embodiments of this application will be clearly described below with reference to the drawings in the embodiment of this application. Apparently, the described embodiments are merely some rather than all of the embodiments of this application. All other embodiments obtained by those skilled in the art based on the embodiments of this application still fall within the scope of protection of this application.

Terms such as "first" and "second" in the description and claims of this application are used for distinguishing similar objects, instead of describing a specific order or sequence. It is to be understood that the terms used in this way may be interchanged in appropriate cases, so that the embodiments described here can be implemented in order other than the content illustrated or described here; the objects distinguished by "first" and "second" are usually of the same class, the number of the objects is not limited, and for example, the number of the first object may be one or more. In addition, the expression "and/or" in the description and claims represents at least one of connected objects, and the character "/" generally represents that associated objects are in an 'or' relationship.

It is worth noting that the technology described in the embodiments of this application is used in, but not limited to, the Long Term Evolution (LTE)/LTE Advanced (LTE-A) system, but also can be used in other wireless communication systems, such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA), and other systems. The terms "system" and "network" in the embodiments of this application are often interchangeably used, and the described technology can be used not only for the systems and radio technologies mentioned above, but also for other systems and radio technologies. The following description describes the New Radio (NR) system for example purposes, and uses NR terminology in most of the following description. These technologies can also be applied to applications in addition to the NR system, such as the 6th Generation (6G) communication system.

Figure 1:
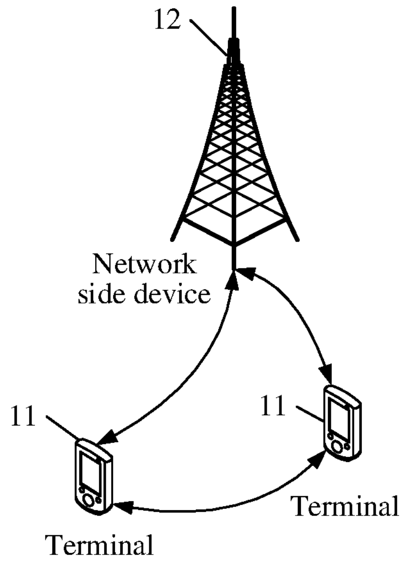
FIG. 1 is a schematic diagram of a wireless communication system according to an embodiment of this application.

FIG. 1 illustrates a schematic diagram of a wireless communication system that can be applied according to an embodiment of this application. The wireless communication system includes a terminal 11 and a network side device 12. The terminal 11 may also be called terminal device or user equipment (UE). The terminal 11 may be a terminal device such as a mobile phone, a tablet personal computer, a laptop computer or a laptop, a Personal Digital Assistant (PDA), a palmtop computer, a netbook, an Ultra-Mobile Personal Computer (UMPC), a Mobile Internet Device (MID), a wearable device, Vehicle-mounted User Equipment (VUE), Pedestrian User Equipment (PUE). The wearable device includes a bracelet, an earphone, glasses, etc. The type of the terminal 11 is not limited in the embodiment of this application. The network side device 12 may be a base station or a core network. The base station may be referred to as node B, evolved node B, access point, Base Transceiver Station (BTS), radio base station, radio transceiver, Basic Service Set (BSS), Extended Service Set (ESS), B node, evolved B node (eNB), next generation node B (gNB), home B node, home evolved B node, WLAN access point, WiFi node, Transmitting Receiving Point (TRP), or certain other suitable term in the field, as long as the same technical effect is achieved. The base station is not limited to specific technical vocabulary. In the embodiment of this application, only the base station in the NR system is used as an example, but the type of the base station is not limited.

As previously mentioned, beam indication mechanisms for various channels and reference signals in related technologies are different, which will require large signaling overhead. For high-frequency communication systems, the communication link between the network side device and the terminal may usually use a single-beam mode, that is, the beam directions of control channels, data channels, reference signals, and the like are basically the same. At this time, there is no need to perform beam indication on each channel and reference signal separately. Therefore, the embodiment of this application reduces the signaling overhead in beam indication by indicating a shared common beam for at least two channels or reference signals.

In addition, the embodiments of this application provide various methods for indicating common beams, and provide feedback mechanisms and effective mechanisms for common beams.

The beam indication method and the device provided in the embodiment of this application will be described below through some embodiments and application scenarios with reference to the drawings.

Figure 2:
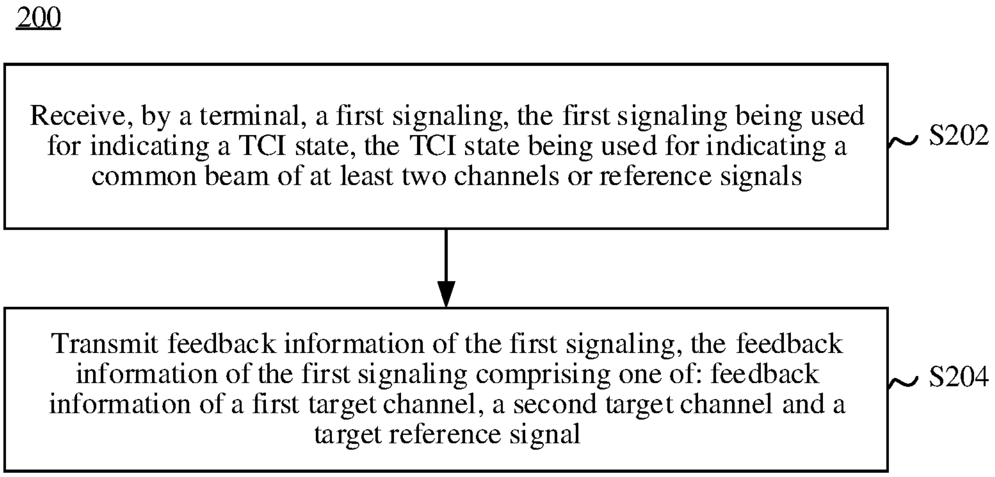
FIG. 2 is a schematic flowchart of a beam indication method according to an embodiment of this application.

Referring to FIG. 2, an embodiment of this application provides a beam indication method 200, which can be executed by a terminal. In other words, the method can be executed by software or hardware installed on the terminal. The method includes the following steps.

In S202, a terminal receives a first signaling. The first signaling is used for indicating a Transmission Configuration Indicator (TCI) state. The TCI state is used for indicating a common beam of at least two channels or reference signals.

In the embodiment of this application, the first signaling may be first Downlink Control Information (DCI) or a first Media Access Control Element (MAC CE).

The TCI state indicated by the first signaling may be used for indicating a common beam of at least two channels or reference signals. For example, the TCI state is used for indicating a common beam shared by at least two channels. Alternatively, the TCI state is used for indicating a common beam shared by at least two reference signals. Alternatively, the TCI state is used for indicating a common beam shared by at least one channel and at least one reference signal.

The channel mentioned above may include, for example, Physical Uplink Control Channel (PUCCH), Physical Uplink Shared Channel (PUSCH), Physical Downlink Control Channel (PDCCH), Physical Downlink Shared Channel (PDSCH), etc.

The reference signal mentioned above may include, for example, Sounding Reference Signal (SRS), Channel State Information-Reference Signal (CSI-RS), Positioning Reference Signal (PRS), etc.

In S204, feedback information of the first signaling is transmitted. The feedback information of the first signaling includes one of: feedback information of a first target channel, a second target channel and a target reference signal.

In the embodiment of this application, the first target channel may be a downlink channel. The first target channel may be scheduled by the first signaling or other scheduling signalings. The second target channel may be an uplink channel. The second target channel may be scheduled by the first signaling or other scheduling signalings. The target reference signal may be an uplink reference signal such as SRS. The target reference signal may be scheduled or triggered by the first signaling or other scheduling signalings.

In the embodiment of this application, the network side device may use the feedback information of the first target channel, the second target channel or the target reference signal as the feedback information of the first signaling.

For example, in a case that the feedback information of the first target channel is Acknowledgment (ACK), the network side device may consider that the feedback information of the first signaling is ACK; in a case that the feedback information of the first target channel is Negative-Acknowledgment (NACK), the network side device may consider that the feedback information of the first signaling is NACK.

For another example, in a case that the network side device has successfully received the second target channel, it may consider that the feedback information of the first signaling is ACK; in a case that the network side device has not successfully received the second target channel, it may consider that the feedback information of the first signaling is NACK.

For yet another example, the network side device performs a sequence correlation analysis on the target reference signal, and determines that the feedback information of the first signaling is ACK/NACK based on an analysis result (comparison between a correlation peak and a preset threshold). For example, in a case that the correlation peak of the target reference signal is greater than or equal to the preset threshold, it is considered that the feedback information of the first signaling is ACK; in a case that the correlation peak of the target reference signal is less than the preset threshold, it is considered that the feedback information of the first signaling is NACK.

In the embodiment of this application, the network side device can indicate the common beam of at least two channels or reference signals through the first signaling, which can reduce signaling overhead compared to the method of indicating beams for these at least two channels or reference signals respectively. In addition, the embodiment of this application can use the feedback information of the first target channel, the second target channel or the target reference signal as the feedback information of the first signaling. The network side device can know whether the terminal has successfully received the first signaling in time, thus facilitating the subsequent transmission of the channels or reference signals through the common beam, and improving the communication efficiency.

The embodiment of this application indirectly uses the feedback information of the first target channel, the second target channel or the target reference signal as the feedback information of the first signaling, so that the robustness of the common beam indication mechanism and consistent understanding of common beam taking-effect between the network side device and the terminal is ensured, thus improving the system performance.

The embodiment of this application indirectly uses the feedback information of the first target channel, the second target channel or the target reference signal as the feedback information of the first signaling, so that no additional feedback information is required to be set for the first signaling, thus reducing the signaling overhead required for setting additional feedback information.

In order to describe the beam indication method according to the embodiment of this application, the method for indicating the common beam, the feedback mechanism of the first signaling and the taking-effect mechanism of the common beam will be respectively described in three aspects.

In a first aspect, the method for indicating the common beam will be mainly introduced, which corresponds to step S202 in embodiment 200.

In a first example, the first signaling includes first DCI. Before the terminal receives the first signaling in S202, the method further includes receiving a first MAC CE signaling. The first MAC CE signaling is used for activating N1 groups of TCI states, where N1 is a positive integer. The first DCI is used for indicating a group of TCI states from the N1 groups of TCI states. In this example, each group of TCI states may include one or more TCI states.

In a second example, the first signaling includes a second MAC CE signaling. The second MAC CE signaling is used for indicating K groups of TCI states, where K is a positive integer. For example, K may be equal to 1. In this example, each group of TCI states may include one or more TCI states. In this example, the TCI state may no longer be indicated in the DCI used for downlink and uplink scheduling.

Optionally, in a case of K≥2, after S202 and before S204, the method further includes, determining, by the terminal, a group of TCI states from the K groups of TCI states based on at least one of: a preset rule (for example, protocol agreement), indication by a third MAC CE signaling or indication by second DCI.

For example, as agreed in the protocol, in reference signals included in the K groups of TCI states, the group of TCI states corresponding to the reference signal with the smallest number, the group of TCI states with the smallest group number, or the TCI states with the topmost group position are used as the TCI states used by the terminal.

Optionally, in the first example and second example above, the N1 groups of TCI states or the K groups of TCI states satisfy at least one of the following 1) to 6).

1) Each group of TCI states includes a joint TCI state for a downlink and an uplink.

For example, for a single-TRP scenario, in the first example, in the N1 groups of TCI states, each group of TCI states includes a joint TCI state for a downlink and an uplink, and each group of TCI states corresponds to a codepoint of a TCI signaling field in the first DCI. The corresponding relationship is as follow: Codepoint—{joint TCI state}.

In the second example above, the format of each group of TCI states in the second MAC CE signaling includes, for example, {joint TCI state}.

2) Each group of TCI states includes a TCI state for a downlink and/or a TCI state for an uplink.

For example, for a single-TRP scenario, in the first example, in the N1 groups of TCI states, each group of TCI states may include a TCI state for a downlink and/or a TCI state for an uplink, and each group of TCI states corresponds to a codepoint of a TCI signaling field in the first DCI. The corresponding relationship is as follow: Codepoint—{DL TCI state, UL TCI state}.

In the second example above, the format of each group of TCI states in the second MAC CE signaling includes, for example, {DL TCI state, UL TCI state}.

3) Each group of TCI states includes a joint TCI state for a downlink and an uplink corresponding to each TRP identifier.

For example, for a multi-TRP single-DCI scenario, in the first example, in the N1 groups of TCI states, each group of TCI states includes a joint TCI state for a downlink and an uplink corresponding to each TRP identifier, and each group of TCI states corresponds to a codepoint of a TCI signaling field in the first DCI. The corresponding relationship is as follow: Codepoint—{joint TCI state for TRP1, joint TCI state for TRP2, . . . }.

In the second example above, the format of each group of TCI states in the second MAC CE signaling includes, for example, {joint TCI state for TRP1, joint TCI state for TRP2, . . . }.

4) Each group of TCI states includes a TCI state for a downlink and/or a TCI state for an uplink corresponding to each TRP identifier.

For example, for a multi-TRP single-DCI scenario, in the first example, in the N1 groups of TCI states, each group of TCI states may include a TCI state for a downlink and/or a TCI state for an uplink corresponding to each TRP identifier, and each group of TCI states corresponds to a codepoint of a TCI signaling field in the first DCI. The following example is only for description, and the order of arrangement may be agreed in the protocol. Codepoint—{DL TCI state for TRP1, UL TCI state DL TCI state for TRP1, DL TCI state for TRP2, UL TCI state DL TCI state for TRP2, . . . }.

In the second example above, the format of each group of TCI states in the second MAC CE signaling includes, for example, {DL TCI state for TRP1, UL TCI state DL TCI state for TRP1, DL TCI state for TRP2, UL TCI state DL TCI state for TRP2, . . . }.

5) Each group of TCI states includes a joint TCI state for a downlink and an uplink corresponding to one TRP identifier.

For example, for a multi-TRP multi-DCI scenario, in the first example, in the N1 groups of TCI states, each group of TCI states includes a joint TCI state for a downlink and an uplink corresponding to one TRP identifier. In the second example above, for the format of each group of TCI states in the second MAC CE signaling, refer to the format of the TCI state in the first DCI.

6) Each group of TCI states includes a TCI state for a downlink and/or a TCI state for an uplink corresponding to one TRP identifier.

For example, for a multi-TRP multi-DCI scenario, in the first example, in the N1 groups of TCI states, each group of TCI states includes a joint TCI state for a downlink and an uplink corresponding to one TRP identifier. In the second example above, for the format of each group of TCI states in the second MAC CE signaling, refer to the format of the TCI state in the first DCI.

For 1) to 6), for example, in a case that the first signaling is first DCI, each group of TCI states corresponds to a codepoint of a TCI signaling field in the first DCI.

Optionally, in the first example and second example above, before S202, the terminal may further receive configuration information. The configuration information is used for configuring at least one of the following 1) to 3).

1) The first signaling is used for indicating a TCI state in a single-TRP scenario or a TCI state in a multi-TRP scenario. The multi-TRP scenario may be extended to TCI state indication in both single-DCI mode and multi-DCI mode.

2) The first signaling is used for indicating a TCI state of a single-DCI mode or a multi-DCI mode in a multi-TRP scenario.

3) A TCI state for an uplink and a TCI state for a downlink are joint or separate.

In a third example, in a case that the TCI states for the uplink and downlink are different, the first signaling mentioned in embodiment 200 includes first DCI. Before the terminal receives the first signaling, the method further includes: receiving a fourth MAC CE signaling, the fourth MAC CE signaling being used for activating N2 groups of TCI states for an uplink; and receiving a fifth MAC CE signaling, the fifth MAC CE signaling being used for activating N3 groups of TCI states for a downlink. The first DCI is used for indicating a group of TCI states from the N2 groups of TCI states, and indicating a group of TCI states from the N3 groups of TCI states, where N2 and N3 are positive integers.

The fourth MAC CE signaling and the fifth MAC CE signaling in this example may be the same or different.

Optionally, for the six cases 1) to (6) listed in the first example and second example, or for the embodiment in the third example, the method may further include determining, by the terminal, that a target TCI state in each group of TCI states is used for an uplink or a downlink, or determining a TRP identifier corresponding to a target TCI state in each group of TCI states based on at least one of the following 1) to 4).

1) An arrangement order or position of the target TCI state.

2) A codepoint corresponding to the target TCI state is used for a downlink or an uplink.

3) A TRP identifier corresponding to the codepoint corresponding to the target TCI state.

4) A TCI state pool from which the target TCI state is selected. For example, a TCI state from a downlink TCI state pool is used for a downlink, and a TCI state from an uplink TCI state pool is used for an uplink.

In the first aspect, the method for indicating the common beam is mainly introduced. The feedback mechanism of the first signaling will be introduced below in a second aspect, which corresponds to step S204 in embodiment 200.

In a first example, the first signaling includes first DCI, and the first DCI is further used for scheduling a downlink or uplink channel, such as PDSCH or PUSCH. The first target channel is a downlink channel scheduled by the first DCI. The second target channel is an uplink channel scheduled by the first DCI. For example, in this example, the feedback information of the first DCI may be determined based on the feedback information of the PDSCH scheduled by the first DCI. For example, the ACK information of the PDSCH is used as the ACK information of the first DCI.

In a second example, the first signaling includes first DCI, and the first DCI does not schedule a downlink or uplink channel. The first target channel is the nearest downlink channel before the receiving time of the first DCI (which may be scheduled by other DCI other than the first DCI), and the second target channel is the nearest uplink channel before the receiving time of the first DCI (which may be scheduled by other DCI other than the first DCI). Alternatively, the first target channel is the nearest downlink channel after the receiving time of the first DCI, and the second target channel is the nearest uplink channel after the receiving time of the first DCI.

The first target channel mentioned in this example is scheduled by DCI other than the first DCI, and this embodiment may not limit the transmission order of the other DCI and the first DCI.

In a third example, the first signaling includes first DCI, and the first DCI does not schedule a downlink or uplink channel. The first target channel is a downlink channel at the nearest time after a first preset duration after the receiving time of the first DCI, and the second target channel is an uplink channel at the nearest time after the first preset duration after the receiving time of the first DCI.

Compared to the second example above, this example can avoid the problem of inaccurate feedback information caused by that the time interval between channels scheduled by the first DCI and the other DCI is too small, and the decoding of the first DCI is not completed. By limiting the first preset duration, the receiving and decoding time of the first DCI is considered and the accuracy of the feedback information is improved.

For the three examples, the feedback information of the first target channel is feedback information based on a Code Block Group (CBG). In a case that at least one ACK exists in the feedback information of multiple CBGs corresponding to the first target channel, the network side device may consider that the feedback information of the first DCI is ACK.

For the three examples, the feedback information of the first target channel includes feedback information of one downlink channel (which may be scheduled by the first DCI or not). The network side device uses ACK or NACK of the downlink channel as the ACK of the first DCI; and/or in a case that the network side device has not received the feedback information of the downlink channel, the network side device considers that the feedback information of the first DCI is NACK.

This example considers that the first DCI can still be received successfully even though the downlink channel is not successfully decoded since the data volume of the downlink channel such as downlink data channel is large.

Optionally, in a case that the second target channel includes a PUSCH, the network side device determines the feedback information of the first signaling based on whether the PUSCH has been correctly received. For example, in a case that the network side device has correctly received the PUSCH, it determines that the feedback information of the first signaling is ACK; and in a case that the network side device has not correctly received the PUSCH, it determines that the feedback information of the first signaling is NACK.

For the three examples, a beam of the first target channel, the feedback information of the first target channel or the second target channel satisfies one of the following 1) to 5).

1) A common beam indicated by the first signaling is used.
2) A common beam currently used is used. The common beam currently used may be different from the common beam indicated by the first signaling.
3) After a second preset duration after the receiving time of the first DCI, the first target channel, the feedback information of the first target channel or the second target channel uses a common beam indicated by the first DCI.
4) In a case that a time interval between the DCI scheduling the first target channel and the first DCI reaches a preset value, the first target channel or the feedback information of the first target channel uses a common beam indicated by the first DCI.
5) In a case that a time interval between scheduling the second target channel the DCI and the first DCI reaches a preset value, the second target channel uses a common beam indicated by the first DCI.

For the three examples, the second target channel includes a PUSCH, and the method further includes receiving third DCI and determining whether the network side device has received the feedback information of the first signaling based on the third DCI.

Determining whether the network side device has received the feedback information of the first signaling based on the third DCI mentioned above includes: in a case that a hybrid automatic repeat request (HARQ) process number used by the third DCI when scheduling a second PUSCH is the same as an HARQ process number used when scheduling a first PUSCH, and the third DCI includes an unflipped New Data Indicator (NDI) field value, determining that the network side device has received the feedback information of the first signaling. The first PUSCH is the second target channel. The first PUSCH may be scheduled by the first DCI or other DCI other than the first DCI.

In the first three examples in the second aspect, description is made mainly by taking the feedback information of the first signaling being the feedback information of the first target channel or the second target channel as an example. Description will be made below by taking the feedback information of the first signaling being the target reference signal as an example.

In a fourth example, the first signaling includes first DCI, and the first DCI is further used for triggering an aperiodic Sounding Reference Signal (SRS). The target reference signal is the SRS.

In a fifth example, the first signaling includes first DCI, and the first DCI does not trigger an aperiodic SRS. The target reference signal is the nearest SRS before or after the receiving time of the first DCI; or the target reference signal is the nearest SRS triggered by DCI before or after the receiving time of the first DCI.

In a sixth example, the first signaling includes first DCI, and the first DCI does not trigger an aperiodic SRS. The target reference signal is an SRS at the nearest time after a third preset duration after the receiving time of the first DCI.

Compared to the fifth example above, this example can avoid the problem of inaccurate feedback information caused by that the time interval between SRSs triggered by the first DCI and the other DCI is too small, and the decoding of the first DCI is not completed. By limiting the third preset duration, the receiving and decoding time of the first DCI is considered and the accuracy of the feedback information is improved.

In a seventh example, the first signaling includes a first DCI; the target reference signal is the nearest SRS before or after the receiving time of the first DCI. The SRS is a periodic or semi-persistent SRS.

In an eighth example, the first signaling includes first DCI, the first DCI carries a trigger signaling, the trigger signaling is associated with a periodic or semi-persistent SRS, and transmitting feedback information of the first signaling includes transmitting a first SRS based on the trigger signaling. The first SRS is the periodic or semi-persistent SRS, or the first SRS is different from the periodic or semi-persistent SRS. The target reference signal is the first SRS.

Optionally, a target slot offset value of the first SRS is obtained based on at least one of the following 1) to 3).

1) A slot offset value of the periodic or semi-persistent SRS.
2) Indication by the first signaling. A target slot offset value indicated by the first DCI may be different from the slot offset value in 1).
3) Configuration by a higher-layer parameter.

For example, the period of a periodic or semi-persistent SRS is 10 ms, and the periodic or semi-persistent SRS is transmitted at time domain positions 0, 10, 20, 30, . . . . At time domain position 0, the terminal receives the first DCI, and the target slot offset value indicated by the first DCI is 5 ms. Therefore, the terminal may additionally transmit a first SRS at time domain position 5, that is, the target slot offset value is 5 ms indicated by the first DCI or configured by a higher-layer parameter. Alternatively, the terminal may ignore the limit of 5 ms indicated by the DCI or configured by the higher-layer parameter, and does not additionally transmit an SRS at time domain position 5. The first SRS is a periodic or semi-persistent SRS transmitted at time domain position 10.

Optionally, the method further includes: in a case that the transmitting time of the first SRS is different from the transmitting time of the periodic or semi-persistent SRS, transmitting the periodic or semi-persistent SRS based on the receiving time of the first DCI, the target slot offset value and the period of the periodic or semi-persistent SRS.

The introduction of the previous example is continued. After the terminal transmits the first SRS at time domain position 5, the positions of subsequent SRSs change from 10, 20, 30, . . . to 15, 25, 35, . . . . Of course, in other examples, the transmitting positions of the subsequent SRSs may remain unchanged, which are continuously transmitted according to the time domain positions 10, 20, 30, . . . .

Optionally, for the SRSs used as the target reference signals mentioned in the fourth to eighth examples above, the DCI triggering these SRSs, i.e., the target reference signals, satisfies at least one of the following 1) to 2).

1) A Frequency Domain Resource Assignment (FDRA) field is set to 0.

2) Cyclic Redundancy Check (CRC) is scrambled by a Cell-Radio Network Temporary Identifier (C-RNTI).

For example, the FDRA field of the DCI triggering the target reference signal is set to 0 and the CRC of the DCI is scrambled by C-RNTI. For another example, the FDRA field of the DCI triggering the target reference signal is set to 0. For yet another example, the CRC of the DCI triggering the target reference signal is scrambled by C-RNTI.

In this embodiment, through the special settings for the DCI mentioned above, the terminal and the network side device can determine that the SRS triggered by the DCI is used as the feedback information of the first DCI.

In this embodiment, the DCI triggering the target reference signal may be the first DCI or other DCI other than the first DCI.

Optionally, the SRS mentioned in the fourth to eighth examples above is configured for one of: antenna switching, codebook purpose, non-codebook purpose and beam management.

For example, in a case that a PUSCH is configured as a codebook, the SRS is for a codebook purpose; and/or in a case that a PUSCH is configured as a non-codebook, the SRS is for a non-codebook purpose.

Optionally, a beam of the SRS mentioned in the fourth to eighth examples above satisfies at least one of the following 1) to 3).

1) A beam configured for the SRS, such as spatial relation configured for the SRS.

2) A common beam indicated by the first signaling. For example, for the SRS for a codebook purpose, using the TCI state indicated by the first DCI can measure the channel link information of the common beam direction newly indicated by the network side device, such as channel estimation.

3) A common beam used for current transmission, i.e., a common beam used before the common beam indicated by the first signaling.

Optionally, in the embodiments above, the network side device or terminal may further perform one of the following 1) to 6).

1) Using any one of the feedback information of the first target channel, the second target channel and the target reference signal as the feedback information of the first signaling.

2) Using the first transmitted one of the feedback information of the first target channel, the second target channel and the target reference signal as the feedback information of the first signaling.

3) Using the first transmitted one of the feedback information of the first target channel, the second target channel and the target reference signal after a sixth preset duration after the transmitting time of the first signaling as the feedback information of the first signaling.

4) Preferentially using the feedback information of the first target channel as the feedback information of the first signaling.

5) Preferentially using the second target channel as the feedback information of the first signaling.

6) Preferentially using the target reference signal as the feedback information of the first signaling.

For example, in a case that there is both SRS and PDSCH feedback information, the feedback information of the first signaling may be determined based solely on the feedback information of PDSCH or SRS alone. Alternatively, the feedback information of the first signaling may be determined based on one of the two, such as the first transmitted one. Alternatively, the feedback information of the first signaling may be determined based on the first transmitted one of the two after a sixth preset duration after the first signaling. Alternatively, the feedback information of the PDSCH scheduled by the first signaling may be preferentially used, or the SRS triggered by the first signaling may be preferentially used. The first signaling can schedule the PDSCH and trigger the SRS at different times.

In the first aspect, the method for indicating the common beam is mainly introduced. In the second aspect, the feedback mechanism of the first signaling is mainly introduced. The taking-effect mechanism of the common beam indicated by the first signaling will be introduced below in a third aspect.

In an example, embodiment 200 further includes transmitting a channel or a reference signal through the common beam after the common beam takes effect.

Optionally, transmitting a channel or a reference signal through the common beam after the common beam takes effect includes: in a case that the feedback information of the first signaling is ACK, transmitting at least one of the following through the common beam after a fourth preset duration after transmitting the feedback information of the first signaling: the first signaling, DCI other than the first signaling, or an uplink channel carrying the feedback information of the first signaling. Before the fourth preset duration after transmitting the feedback information of the first signaling, the channel or the reference signal is transmitted continuously by using the common beam currently used.

Optionally, transmitting at least one of the following through the common beam after a fourth preset duration after transmitting the feedback information of the first signaling includes: in a case that the feedback information includes a plurality of ACK/NACK of the first signaling, transmitting at least one of the following through the common beam after a fourth preset duration after transmitting the latest ACK: the first signaling, DCI other than the first signaling, or an uplink channel carrying the feedback information of the first signaling.

For example, in a case that the feedback information transmitted by the terminal includes a plurality of ACK/NACK of the first signaling, at least one of the following is transmitted through the common beam after a fourth preset duration after transmitting the nearest/latest/nearest ACK relative to the current time. The "current time" mentioned here may be a certain time after the plurality of ACK/NACK have been transmitted.

For example, four first DCI continuously transmitted by the network side device all indicate a common beam, the terminal codes the feedback information of these four first DCI together and transmits them to the network side device, and the taking-effect time of the common beam is determined by using the ACK that ranks last among these four feedback information. For example, in a case that these four feedback information are respectively NACK, ACK, NACK and ACK, the taking-effect time of the common beam is determined by using the ACK that ranks last.

Optionally, the plurality of first signalings indicate the same TCI state.

The fourth preset duration mentioned in the example is predefined or configured by the network side device, and the value of the fourth preset duration supports at least one of beam switching delay, antenna switching delay or antenna panel switching delay of the terminal.

Optionally, the uplink channel used for carrying the feedback information of the PDSCH may use the TCI state indicated by the first signaling.

In each of the examples above, a Path Loss Reference Signal (PL RS) of an uplink channel and the common beam indicated by the first signaling take effect at the same time. The PL RS is determined based on at least one of the following 1) to 4).

1) A downlink RS in the TCI state indicated by the first signaling. This DL RS is a periodic RS.
2) A downlink RS associated with an RS in the TCI state indicated by the first signaling. The RS in the TCI state is a semi-persistent RS or an aperiodic RS.
3) In a case that a source RS in the TCI state indicated by the first signaling is an SRS, the PL RS is a PL RS updated by MAC CE (MAC CE update PL RS) or a downlink RS associated with the SRS.
4) In a case that the TCI state indicated by the first signaling includes a TCI state for a downlink and a TCI state for an uplink, and the TCI state for the uplink includes an SRS, the PL RS is a downlink RS in the TCI state for the downlink or a PL RS updated by MAC CE. The TCI state for the uplink and the DL RS or the TCI state for the downlink correspond to the same TRP identifier.

Optionally, the target reference signal includes an SRS, and transmitting a channel or a reference signal through the common beam after the common beam takes effect includes at least one of the following 1) or 2).

1) Transmitting the channel or the reference signal by using a current TCI state or the TCI state indicated by the first signaling between the transmitting time of the SRS and a fifth preset duration.
2) Transmitting the channel or the reference signal by using the TCI state indicated by the first signaling after the fifth preset duration after the transmitting time of the SRS.

Among the above three aspects, the embodiments in any two or three aspects may also be combined to form new embodiments, which will not be listed one by one here in order to avoid repetition.

The preset duration mentioned in various embodiments of this application, for example, the first preset duration to the sixth preset duration, may be partially or completely equal, or may be separately unequal.

The beam indication method according to an embodiment of this application is described above with reference to FIG. 2. A beam indication method according to another embodiment of this application will be described below with reference to FIG. 3. The interaction between the network side device and the terminal described from the network side device is the same as that described from the terminal in the method illustrated in FIG. 2. In order to avoid repetition, relevant descriptions are appropriately omitted.

Figure 3:
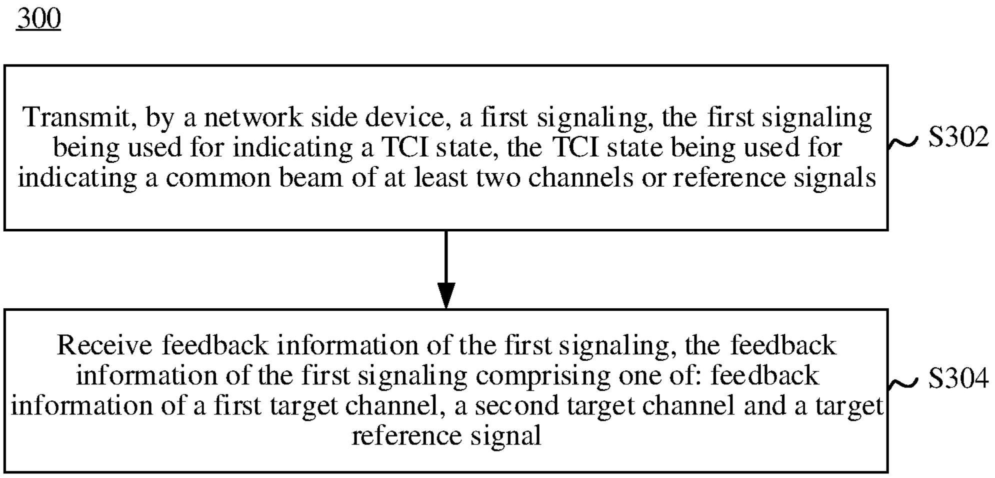
FIG. 3 is a schematic flowchart of a beam indication method according to an embodiment of this application.

FIG. 3 is a flowchart of a beam indication method according to an embodiment of this application, which can be applied to the network side device. Referring to FIG. 3, the method 300 includes the following steps.

In S302, a network side device transmits a first signaling. The first signaling is used for indicating a TCI state. The TCI state is used for indicating a common beam of at least two channels or reference signals.

In S304, feedback information of the first signaling is received. The feedback information of the first signaling includes one of: feedback information of a first target channel, a second target channel and a target reference signal.

In the embodiment of this application, the network side device can indicate the common beam of at least two channels or reference signals through the first signaling, which can reduce signaling overhead compared to the method of indicating beams for these at least two channels or reference signals respectively. In addition, the embodiments of this application can use the feedback information of the first target channel, the second target channel or the target reference signal as the feedback information of the first signaling. The network side device can know whether the terminal has successfully received the first signaling in time, thus facilitating the subsequent transmission of the channels or reference signals through the common beam, and improving the communication efficiency.

Optionally, as an embodiment, the first signaling includes first DCI, and before the network side device transmits the first signaling, the method further includes transmitting a first MAC CE signaling. The first MAC CE signaling is used for activating N1 groups of TCI states. The first DCI is used for indicating a group of TCI states from the N1 groups of TCI states, where N1 is a positive integer.

Optionally, as an embodiment, the first signaling includes a second MAC CE signaling. The second MAC CE signaling is used for indicating K groups of TCI states, where K is a positive integer.

Optionally, as an embodiment, in a case of K≥2, the terminal is further configured to determine a group of TCI states from the K groups of TCI states based on at least one of: a preset rule, indication by a third MAC CE signaling or indication by second DCI.

Optionally, as an embodiment, the N1 groups of TCI states or the K groups of TCI states satisfy at least one of the following 1) to 6): 1) each group of TCI states includes a joint TCI state for a downlink and an uplink; 2) each group of TCI states includes a TCI state for a downlink and/or a TCI state for an uplink; 3) each group of TCI states includes a joint TCI state for a downlink and an uplink corresponding to each TRP identifier; 4) each group of TCI states includes a TCI state for a downlink and/or a TCI state for an uplink corresponding to each TRP identifier; 5) each group of TCI states includes a joint TCI state for a downlink and an uplink corresponding to one TRP identifier; 6) each group of TCI states includes a TCI state for a downlink and/or a TCI state for an uplink corresponding to one TRP identifier.

Optionally, as an embodiment, in a case that the first signaling is first DCI, each group of TCI states corresponds to a codepoint of a TCI signaling field in the first DCI.

Optionally, as an embodiment, the method further includes transmitting configuration information. The configuration information is used for configuring at least one of the following 1) to 3): 1) the first signaling is used for indicating a TCI state in a single-TRP scenario or a TCI state in a multi-TRP scenario; 2) the first signaling is used for indicating a TCI state of a single-DCI mode or a multi-DCI mode in a multi-TRP scenario; 3) a TCI state for an uplink and a TCI state for a downlink are joint or separate.

Optionally, as an embodiment, the first signaling includes first DCI, and before the network side device transmits the first signaling, the method further includes: transmitting a fourth MAC CE signaling, the fourth MAC CE signaling being used for activating N2 groups of TCI states for an uplink; and transmitting a fifth MAC CE signaling, the fifth MAC CE signaling being used for activating N3 groups of TCI states for a downlink. The first DCI is used for indicating a group of TCI states from the N2 groups of TCI states and indicating a group of TCI states form the N3 groups of TCI states, where N2 and N3 are positive integers.

Optionally, as an embodiment, the terminal determines that a target TCI state in each group of TCI states is used for an uplink or a downlink, or determines a TRP identifier corresponding to a target TCI state in each group of TCI states based on at least one of the following 1) to 4): 1) an arrangement order or position of the target TCI state; 2) a codepoint corresponding to the target TCI state is used for a downlink or an uplink; 3) a TRP identifier corresponding to the codepoint corresponding to the target TCI state; 4) a TCI state pool from which the target TCI state is selected.

Optionally, as an embodiment, the first signaling includes first DCI, and the first DCI is further used for scheduling a downlink or uplink channel. The first target channel is a downlink channel scheduled by the first DCI. The second target channel is an uplink channel scheduled by the first DCI.

Optionally, as an embodiment, the first signaling includes first DCI, and the first DCI does not schedule a downlink or uplink channel. The first target channel is the nearest downlink channel before the transmitting time of the first DCI, and the second target channel is the nearest uplink channel before the transmitting time of the first DCI. Alternatively, the first target channel is the nearest downlink channel after the transmitting time of the first DCI, and the second target channel is the nearest uplink channel after the transmitting time of the first DCI.

Optionally, as an embodiment, the first signaling includes first DCI, and the first DCI does not schedule a downlink or uplink channel. The first target channel is a downlink channel at the nearest time after a first preset duration after the transmitting time of the first DCI, and the second target channel is an uplink channel at the nearest time after the first preset duration after the transmitting time of the first DCI.

Optionally, as an embodiment, the feedback information of the first target channel is feedback information based on a Code Block Group (CBG). In a case that at least one ACK exists in the feedback information of multiple CBGs corresponding to the first target channel, the feedback information of the first DCI is ACK.

Optionally, as an embodiment, the feedback information of the first target channel includes feedback information of one downlink channel. The method further includes: using ACK or NACK of the downlink channel as the ACK of the first DCI; and/or in a case that the feedback information of the downlink channel has not been received, considering that the feedback information of the first DCI is NACK.

Optionally, as an embodiment, a beam of the first target channel, the feedback information of the first target channel or the second target channel satisfies one of the following 1) to 5): 1) a common beam indicated by the first signaling; 2) a common beam currently used; 3) after a second preset duration after the transmitting time of the first DCI, the first target channel, the feedback information of the first target channel or the second target channel uses a common beam indicated by the first DCI; 4) in a case that a time interval between the DCI scheduling the first target channel and the first DCI reaches a preset value, the first target channel or the feedback information of the first target channel uses a common beam indicated by the first DCI; 5) in a case that a time interval between the DCI scheduling the second target channel and the first DCI reaches a preset value, the second target channel uses a common beam indicated by the first DCI.

Optionally, as an embodiment, the second target channel includes a PUSCH, and the method further includes determining the feedback information of the first signaling based on whether the PUSCH has been correctly received.

Optionally, as an embodiment, the second target channel includes a PUSCH, and the method further includes transmitting third DCI. The third DCI is used for determining, by the terminal, whether the network side device has received the feedback information of the first signaling.

Optionally, as an embodiment, in a case that an HARQ process number used by the third DCI when scheduling a second PUSCH is the same as an HARQ process number used when scheduling a first PUSCH, and the third DCI includes an unflipped New Data Indicator (NDI) field value, the terminal determines that the network side device has received the feedback information of the first signaling. The first PUSCH is the second target channel.

Optionally, as an embodiment, the first signaling includes first DCI, and the first DCI is further used for triggering an aperiodic Sounding Reference Signal (SRS). The target reference signal is the SRS.

Optionally, as an embodiment, the first signaling includes first DCI, and the first DCI does not trigger an aperiodic SRS. The target reference signal is the nearest SRS before or after the transmitting time of the first DCI; or the target reference signal is the nearest SRS triggered by DCI before or after the transmitting time of the first DCI.

Optionally, as an embodiment, the first signaling includes first DCI, and the first DCI does not trigger an aperiodic SRS. The target reference signal is an SRS at the nearest time after a third preset duration after the transmitting time of the first DCI.

Optionally, as an embodiment, the first signaling includes a first DCI; the target reference signal is the nearest SRS before or after the transmitting time of the first DCI. The SRS is a periodic or semi-persistent SRS.

Optionally, as an embodiment, the first signaling includes first DCI, the first DCI carries a trigger signaling, the trigger signaling is associated with a periodic or semi-persistent SRS, and receiving feedback information of the first signaling includes receiving a first SRS based on the trigger signaling. The first SRS is the periodic or semi-persistent SRS, or the first SRS is different from the periodic or semi-persistent SRS. The target reference signal is the first SRS.

Optionally, as an embodiment, a target slot offset value of the first SRS is obtained based on at least one of: 1) a slot offset value of the periodic or semi-persistent SRS; 2) indication by the first signaling; or 3) configuration by a higher-layer parameter.

Optionally, as an embodiment, the method further includes: in a case that the receiving time of the first SRS is different from the receiving time of the periodic or semi-persistent SRS, receiving the periodic or semi-persistent SRS based on the transmitting time of the first DCI, the target slot offset value and the period of the periodic or semi-persistent SRS.

Optionally, as an embodiment, DCI triggering the target reference signal satisfies at least one of: 1) an FDRA field is set to 0; or 2) CRC is scrambled by a C-RNTI.

Optionally, as an embodiment, the purpose of the SRS is configured as one of: antenna switching, codebook purpose, non-codebook purpose and beam management.

Optionally, as an embodiment, in a case that a PUSCH is configured as a codebook, the SRS is for a codebook purpose; and/or in a case that a PUSCH is configured as a non-codebook, the SRS is for a non-codebook purpose.

Optionally, as an embodiment, a beam of the SRS satisfies at least one of: a beam configured for the SRS; a common beam indicated by the first signaling; or a common beam used for current transmission.

Optionally, as an embodiment, the method further includes one of the following 1) to 6): 1) using any one of the feedback information of the first target channel, the second target channel and the target reference signal as the feedback information of the first signaling; 2) using the first transmitted one of the feedback information of the first target channel, the second target channel and the target reference signal as the feedback information of the first signaling; 3) using the first transmitted one of the feedback information of the first target channel, the second target channel and the target reference signal after a sixth preset duration after the transmitting time of the first signaling as the feedback information of the first signaling; 4) preferentially using the feedback information of the first target channel as the feedback information of the first signaling; 5) preferentially using the second target channel as the feedback information of the first signaling; 6) preferentially using the target reference signal as the feedback information of the first signaling.

Optionally, as an embodiment, the method further includes transmitting a channel or a reference signal through the common beam after the common beam takes effect.

Optionally, as an embodiment, transmitting a channel or a reference signal through the common beam after the common beam takes effect includes: in a case that the feedback information of the first signaling is ACK, transmitting at least one of the following 1) to 3) through the common beam after a fourth preset duration after receiving the feedback information of the first signaling: 1) the first signaling, 2) DCI other than the first signaling, and 3) an uplink channel carrying the feedback information of the first signaling.

Optionally, as an embodiment, transmitting at least one of the following 1) to 3) through the common beam after a fourth preset duration after receiving the feedback information of the first signaling includes: in a case that the feedback information includes a plurality of ACK/NACK of the first signaling, transmitting at least one of the following a) to c) through the common beam after a fourth preset duration after receiving the latest ACK: a) the first signaling, b) DCI other than the first signaling, and c) an uplink channel carrying the feedback information of the first signaling.

Optionally, as an embodiment, the plurality of first signalings indicate the same TCI state.

Optionally, as an embodiment, the fourth preset duration is predefined or configured by the network side device, and the value of the fourth preset duration supports at least one of beam switching delay, antenna switching delay or antenna panel switching delay of the terminal.

Optionally, as an embodiment, a Path Loss Reference Signal (PL RS) of an uplink channel and the common beam take effect at the same time, and the PL RS is determined based on at least one of the following 1) to 4): 1) a downlink RS in the TCI state indicated by the first signaling; 2) a downlink RS associated with an RS in the TCI state indicated by the first signaling; 3) in a case that a source RS in the TCI state indicated by the first signaling is an SRS, the PL RS is a PL RS updated by MAC CE or a downlink RS associated with the SRS; 4) in a case that the TCI state indicated by the first signaling includes a TCI state for a downlink and a TCI state for an uplink, and the TCI state for the uplink includes an SRS, the PL RS is a downlink RS in the TCI state for the downlink or a PL RS updated by MAC CE.

Optionally, as an embodiment, the target reference signal includes an SRS, and the transmitting a channel or a reference signal through the common beam after the common beam takes effect includes at least one of the following 1) or 2): 1) transmitting the channel or the reference signal by using a current TCI state or the TCI state indicated by the first signaling between the receiving time of the SRS and a fifth preset duration; 2) transmitting the channel or the reference signal by using the TCI state indicated by the first signaling between after the fifth preset duration after the receiving time of the SRS.

The beam indication method provided in the embodiment of this application may be executed by a beam indication apparatus, or by a control module of the beam indication apparatus configured to execute the beam indication method. In the embodiment of this application, the beam indication apparatus provided in the embodiment of this application is described by taking that the beam indication apparatus executes the beam indication method as an example.

Figure 4:
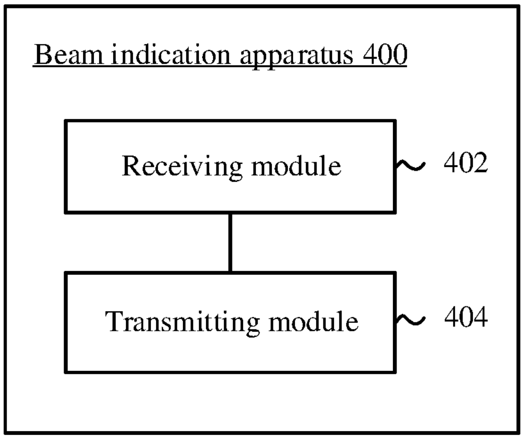
FIG. 4 is a structural schematic diagram of a beam indication apparatus according to an embodiment of this application.

FIG. 4 is a structural schematic diagram of a beam indication apparatus according to an embodiment of this application. The apparatus may correspond to the terminal in other embodiments. Referring to FIG. 4, the apparatus 400 includes the following modules.

A receiving module 402 may be configured to receive a first signaling. The first signaling is used for indicating a TCI state. The TCI state is used for indicating a common beam of at least two channels or reference signals.

A transmitting module 404 may be configured to transmit feedback information of the first signaling. The feedback information of the first signaling includes one of: feedback information of a first target channel, a second target channel and a target reference signal.

In the embodiment of this application, the network side device can indicate the common beam of at least two channels or reference signals through the first signaling, which can reduce signaling overhead compared to the method of indicating beams for these at least two channels or reference signals respectively. In addition, the embodiments of this application can use the feedback information of the first target channel, the second target channel or the target reference signal as the feedback information of the first signaling. The network side device can know whether the terminal has successfully received the first signaling in time, thus facilitating the subsequent transmission of the channels or reference signals through the common beam, and improving the communication efficiency.

Optionally, as an embodiment, the first signaling includes first Downlink Control Information (DCI), and the receiving module 402 may be further configured to receive a first Media Access Control Control Element (MAC CE) signaling. The first MAC CE signaling is used for activating N1 groups of TCI states. The first DCI is used for indicating a group of TCI states from the N1 groups of TCI states, where N1 is a positive integer.

Optionally, as an embodiment, the first signaling includes a second MAC CE signaling. The second MAC CE signaling is used for indicating K groups of TCI states, where K is a positive integer.

Optionally, as an embodiment, in a case of K≥2, the apparatus 400 further includes a determination module configured to determine a group of TCI states from the K groups of TCI states based on at least one of: a preset rule, indication by a third MAC CE signaling or indication by second DCI.

Optionally, as an embodiment, the N1 groups of TCI states or the K groups of TCI states satisfy at least one of the following 1) to 6): 1) each group of TCI states includes a joint TCI state for a downlink and an uplink; 2) each group of TCI states includes a TCI state for a downlink and/or a TCI state for an uplink; 3) each group of TCI states includes a joint TCI state for a downlink and an uplink corresponding to each TRP identifier; 4) each group of TCI states includes a TCI state for a downlink and/or a TCI state for an uplink corresponding to each TRP identifier; 5) each group of TCI states includes a joint TCI state for a downlink and an uplink corresponding to one TRP identifier; 6) each group of TCI states includes a TCI state for a downlink and/or a TCI state for an uplink corresponding to one TRP identifier.

Optionally, as an embodiment, in a case that the first signaling is first DCI, each group of TCI states corresponds to a codepoint of a TCI signaling field in the first DCI.

Optionally, as an embodiment, the receiving module 402 may be further configured to receive configuration information. The configuration information is used for configuring at least one of the following 1) to 3): 1) the first signaling is used for indicating a TCI state in a single-TRP scenario or a TCI state in a multi-TRP scenario; 2) the first signaling is used for indicating a TCI state of a single-DCI mode or a multi-DCI mode in a multi-TRP scenario; 3) a TCI state for an uplink and a TCI state for a downlink are joint or separate.

Optionally, as an embodiment, the first signaling includes first DCI, and the receiving module 402 may be further configured to receive a fourth MAC CE signaling, the fourth MAC CE signaling being used for activating N2 groups of TCI states for an uplink; and receive a fifth MAC CE signaling, the fifth MAC CE signaling being used for activating N3 groups of TCI states for a downlink. The first DCI is used for indicating a group of TCI states from the N2 groups of TCI states and indicating a group of TCI states form the N3 groups of TCI states, where N2 and N3 are positive integers.

Optionally, as an embodiment, the apparatus 400 further includes a determination module configured to determine that a target TCI state in each group of TCI states is used for an uplink or a downlink, or determine a TRP identifier corresponding to a target TCI state in each group of TCI states based on at least one of the following 1) to 4): 1) an arrangement order or position of the target TCI state; 2) a codepoint corresponding to the target TCI state is used for a downlink or an uplink; 3) a TRP identifier corresponding to the codepoint corresponding to the target TCI state; 4) a TCI state pool from which the target TCI state is selected.

Optionally, as an embodiment, the first signaling includes first DCI, and the first DCI is further used for scheduling a downlink or uplink channel. The first target channel is a downlink channel scheduled by the first DCI. The second target channel is an uplink channel scheduled by the first DCI.

Optionally, as an embodiment, the first signaling includes first DCI, and the first DCI does not schedule a downlink or uplink channel. The first target channel is the nearest downlink channel before the receiving time of the first DCI, and the second target channel is the nearest uplink channel before the receiving time of the first DCI. Alternatively, the first target channel is the nearest downlink channel after the receiving time of the first DCI, and the second target channel is the nearest uplink channel after the receiving time of the first DCI.

Optionally, as an embodiment, the first signaling includes first DCI, and the first DCI does not schedule a downlink or uplink channel. The first target channel is a downlink channel at the nearest time after a first preset duration after the receiving time of the first DCI, and the second target channel is an uplink channel at the nearest time after the first preset duration after the receiving time of the first DCI.

Optionally, as an embodiment, the feedback information of the first target channel is feedback information based on a Code Block Group (CBG). In a case that at least one ACK exists in the feedback information of multiple CBGs corresponding to the first target channel, the feedback information of the first DCI is ACK.

Optionally, as an embodiment, the feedback information of the first target channel includes feedback information of one downlink channel. The network side device uses ACK or NACK of the downlink channel as the ACK of the first DCI; and/or in a case that the network side device has not received the feedback information of the downlink channel, the network side device considers that the feedback information of the first DCI is NACK.

Optionally, as an embodiment, a beam of the first target channel, the feedback information of the first target channel or the second target channel satisfies one of the following 1) to 5): 1) a common beam indicated by the first signaling; 2) a common beam currently used; 3) after a second preset duration after the receiving time of the first DCI, the first target channel, the feedback information of the first target channel or the second target channel uses a common beam indicated by the first DCI; 4) in a case that a time interval between the DCI scheduling the first target channel and the first DCI reaches a preset value, the first target channel or the feedback information of the first target channel uses a common beam indicated by the first DCI; 5) in a case that a time interval between the DCI scheduling the second target channel and the first DCI reaches a preset value, the second target channel uses a common beam indicated by the first DCI.

Optionally, as an embodiment, the second target channel includes a PUSCH, and the network side device determines the feedback information of the first signaling based on whether the PUSCH has been correctly received.

Optionally, as an embodiment, the second target channel includes a PUSCH, and the receiving module 402 may be further configured to receive third DCI. The third DCI is used for determining whether the network side device has received the feedback information of the first signaling.

Optionally, as an embodiment, determining whether the network side device has received the feedback information of the first signaling based on the third DCI includes: in a case that an HARQ process number used by the third DCI when scheduling a second PUSCH is the same as an HARQ process number used when scheduling a first PUSCH, and the third DCI includes an unflipped New Data Indicator (NDI) field value, determining that the network side device has received the feedback information of the first signaling. The first PUSCH is the second target channel.

Optionally, as an embodiment, the first signaling includes first DCI, and the first DCI is further used for triggering an aperiodic Sounding Reference Signal (SRS). The target reference signal is the SRS.

Optionally, as an embodiment, the first signaling includes first DCI, and the first DCI does not trigger an aperiodic SRS. The target reference signal is the nearest SRS before or after the receiving time of the first DCI; or the target reference signal is the nearest SRS triggered by DCI before or after the receiving time of the first DCI.

Optionally, as an embodiment, the first signaling includes first DCI, and the first DCI does not trigger an aperiodic SRS. The target reference signal is an SRS at the nearest time after a third preset duration after the receiving time of the first DCI.

Optionally, as an embodiment, the first signaling includes a first DCI; the target reference signal is the nearest SRS before or after the receiving time of the first DCI. The SRS is a periodic or semi-persistent SRS.

Optionally, as an embodiment, the first signaling includes first DCI, the first DCI carries a trigger signaling, the trigger signaling is associated with a periodic or semi-persistent SRS, and the transmitting module 404 may be configured to transmit a first SRS based on the trigger signaling. The first SRS is the periodic or semi-persistent SRS, or the first SRS is different from the periodic or semi-persistent SRS. The target reference signal is the first SRS.

Optionally, as an embodiment, a target slot offset value of the first SRS is obtained based on at least one of: a slot offset value of the periodic or semi-persistent SRS; indication by the first signaling; or configuration by a higher-layer parameter.

Optionally, as an embodiment, the transmitting module 404 may be further configured to, in a case that the transmitting time of the first SRS is different from the transmitting time of the periodic or semi-persistent SRS, transmit the periodic or semi-persistent SRS based on the receiving time of the first DCI, the target slot offset value and the period of the periodic or semi-persistent SRS.

Optionally, as an embodiment, DCI triggering the target reference signal satisfies at least one of: 1) an FDRA field is set to 0; or 2) CRC is scrambled by a C-RNTI.

Optionally, as an embodiment, the purpose of the SRS is configured as one of: antenna switching, codebook purpose, non-codebook purpose and beam management.

Optionally, as an embodiment, in a case that a PUSCH is configured as a codebook, the SRS is for a codebook purpose; and/or in a case that a PUSCH is configured as a non-codebook, the SRS is for a non-codebook purpose.

Optionally, as an embodiment, a beam of the SRS satisfies at least one of: a beam configured for the SRS; a common beam indicated by the first signaling; or a common beam used for current transmission.

Optionally, as an embodiment, the receiving module 402 or the transmitting module 404 may be configured to transmit a channel or a reference signal through the common beam after the common beam takes effect.

Optionally, as an embodiment, transmitting a channel or a reference signal through the common beam after the common beam takes effect includes: in a case that the feedback information of the first signaling is ACK, transmitting at least one of the following 1) to 3) through the common beam after a fourth preset duration after transmitting the feedback information of the first signaling: 1) the first signaling, 2) DCI other than the first signaling, and 3) an uplink channel carrying the feedback information of the first signaling.

Optionally, as an embodiment, transmitting at least one of the following 1) to 3) through the common beam after a fourth preset duration after transmitting the feedback information of the first signaling includes: in a case that the feedback information includes a plurality of ACK/NACK of the first signaling, transmitting at least one of the following a) to c) through the common beam after a fourth preset duration after transmitting the latest ACK: a) the first signaling, b) DCI other than the first signaling, and c) an uplink channel carrying the feedback information of the first signaling.

Optionally, as an embodiment, the plurality of first signalings indicate the same TCI state.

Optionally, as an embodiment, the fourth preset duration is predefined or configured by the network side device, and the value of the fourth preset duration supports at least one of beam switching delay, antenna switching delay or antenna panel switching delay of the apparatus 400.

Optionally, as an embodiment, a Path Loss Reference Signal (PL RS) of an uplink channel and the common beam take effect at the same time, and the PL RS is determined based on at least one of the following 1) to 4): 1) a downlink RS in the TCI state indicated by the first signaling; 2) a downlink RS associated with an RS in the TCI state indicated by the first signaling; 3) in a case that a source RS in the TCI state indicated by the first signaling is an SRS, the PL RS is a PL RS updated by MAC CE or a downlink RS associated with the SRS; 4) in a case that the TCI state indicated by the first signaling includes a TCI state for a downlink and a TCI state for an uplink, and the TCI state for the uplink includes an SRS, the PL RS is a downlink RS in the TCI state for the downlink or a PL RS updated by MAC CE.

Optionally, as an embodiment, the target reference signal includes an SRS, and the transmitting a channel or a reference signal through the common beam after the common beam takes effect includes at least one of the following 1) or 2): 1) transmitting the channel or the reference signal by using a current TCI state or the TCI state indicated by the first signaling between the transmitting time of the SRS and a fifth preset duration; 2) transmitting the channel or the reference signal by using the TCI state indicated by the first signaling after the fifth preset duration after the transmitting time of the SRS.

For the apparatus 400 according to the embodiment of this application, refer to the process of the method 200 corresponding to the embodiment of this application. In addition, various units/modules and other operations and/or functions in the apparatus 400 are respectively designed to achieve the corresponding process in the method 200 and can achieve the same or equivalent technical effects, which will not be repeated here for the sake of simplicity.

The beam indication apparatus in the embodiment of this application may be an apparatus, or a component, an integrated circuit or a chip in the terminal. The apparatus may be a mobile terminal or a non-mobile terminal. Exemplarily, the mobile terminal may include, but not limited to, the type of the terminal 11 listed above, and the non-mobile terminals may include a server, a Network Attached Storage (NAS), a Personal Computer (PC), a television (TV), a teller machine, or a self-service machine, which are not specifically limited in the embodiment of this application.

The beam indication apparatus in the embodiment of this application can be an apparatus with an operating system.

The operating system may be Android operating system, iOS operating system, or any one of other possible operating systems, which is not specifically limited in the embodiment of this application.

The beam indication apparatus provided in the embodiment of this application can implement the various processes implemented in the method embodiments illustrated in FIG. 2 and FIG. 3, and achieve the same technical effect, which will not be repeated here to avoid repetition.

Figure 5:
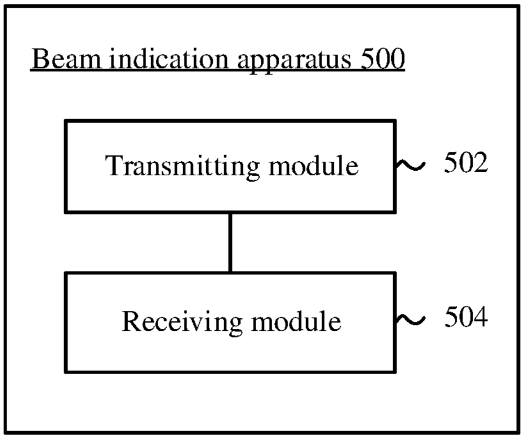
FIG. 5 is a structural schematic diagram of a beam indication apparatus according to an embodiment of this application.

FIG. 5 is a structural schematic diagram of a beam indication apparatus according to an embodiment of this application. The apparatus may correspond to the network side device in other embodiments. Referring to FIG. 5, the apparatus 500 includes the following modules.

A transmitting module 502 may be configured to transmit a first signaling. The first signaling is used for indicating a TCI state. The TCI state is used for indicating a common beam of at least two channels or reference signals.

A receiving module 504 may be configured to receive feedback information of the first signaling. The feedback information of the first signaling includes one of: feedback information of a first target channel, a second target channel and a target reference signal.

In the embodiment of this application, the network side device can indicate the common beam of at least two channels or reference signals through the first signaling, which can reduce signaling overhead compared to the method of indicating beams for these at least two channels or reference signals respectively. In addition, the embodiments of this application can use the feedback information of the first target channel, the second target channel or the target reference signal as the feedback information of the first signaling. The network side device can know whether the terminal has successfully received the first signaling in time, thus facilitating the subsequent transmission of the channels or reference signals through the common beam, and improving the communication efficiency.

Optionally, as an embodiment, the first signaling includes first DCI, and the transmitting module 502 may be further configured to transmit a first MAC CE signaling. The first MAC CE signaling is used for activating N1 groups of TCI states. The first DCI is used for indicating a group of TCI states from the N1 groups of TCI states, where N1 is a positive integer.

Optionally, as an embodiment, the first signaling includes a second MAC CE signaling. The second MAC CE signaling is used for indicating K groups of TCI states, where K is a positive integer.

Optionally, as an embodiment, in a case of K≥2, the terminal is further configured to determine a group of TCI states from the K groups of TCI states based on at least one of: a preset rule, indication by a third MAC CE signaling or indication by second DCI.

Optionally, as an embodiment, the N1 groups of TCI states or the K groups of TCI states satisfy at least one of the following 1) to 6): 1) each group of TCI states includes a joint TCI state for a downlink and an uplink; 2) each group of TCI states includes a TCI state for a downlink and/or a TCI state for an uplink; 3) each group of TCI states includes a joint TCI state for a downlink and an uplink corresponding to each TRP identifier; 4) each group of TCI states includes a TCI state for a downlink and/or a TCI state for an uplink corresponding to each TRP identifier; 5) each group of TCI states includes a joint TCI state for a downlink and an uplink corresponding to one TRP identifier; 6) each group of TCI states includes a TCI state for a downlink and/or a TCI state for an uplink corresponding to one TRP identifier.

Optionally, as an embodiment, in a case that the first signaling is first DCI, each group of TCI states corresponds to a codepoint of a TCI signaling field in the first DCI.

Optionally, as an embodiment, the transmitting module 502 may be further configured to transmit configuration information. The configuration information is used for configuring at least one of: 1) the first signaling is used for indicating a TCI state in a single-TRP scenario or a TCI state in a multi-TRP scenario; 2) the first signaling is used for indicating a TCI state of a single-DCI mode or a multi-DCI mode in a multi-TRP scenario; or 3) a TCI state for an uplink and a TCI state for a downlink are joint or separate.

Optionally, as an embodiment, the first signaling includes first DCI, and the transmitting module 502 may be further configured to transmit a fourth MAC CE signaling, the fourth MAC CE signaling being used for activating N2 groups of TCI states for an uplink; and transmit a fifth MAC CE signaling, the fifth MAC CE signaling being used for activating N3 groups of TCI states for a downlink. The first DCI is used for indicating a group of TCI states from the N2 groups of TCI states and indicating a group of TCI states form the N3 groups of TCI states, where N2 and N3 are positive integers.

Optionally, as an embodiment, the terminal determines that a target TCI state in each group of TCI states is used for an uplink or a downlink, or determines a TRP identifier corresponding to a target TCI state in each group of TCI states based on at least one of the following 1) to 4): 1) an arrangement order or position of the target TCI state; 2) a codepoint corresponding to the target TCI state is used for a downlink or an uplink; 3) a TRP identifier corresponding to the codepoint corresponding to the target TCI state; 4) a TCI state pool from which the target TCI state is selected.

Optionally, as an embodiment, the first signaling includes first DCI, and the first DCI is further used for scheduling a downlink or uplink channel. The first target channel is a downlink channel scheduled by the first DCI. The second target channel is an uplink channel scheduled by the first DCI.

Optionally, as an embodiment, the first signaling includes first DCI, and the first DCI does not schedule a downlink or uplink channel. The first target channel is the nearest downlink channel before the transmitting time of the first DCI, and the second target channel is the nearest uplink channel before the transmitting time of the first DCI. Alternatively, the first target channel is the nearest downlink channel after the transmitting time of the first DCI, and the second target channel is the nearest uplink channel after the transmitting time of the first DCI.

Optionally, as an embodiment, the first signaling includes first DCI, and the first DCI does not schedule a downlink or uplink channel. The first target channel is a downlink channel at the nearest time after a first preset duration after the transmitting time of the first DCI, and the second target channel is an uplink channel at the nearest time after the first preset duration after the transmitting time of the first DCI.

Optionally, as an embodiment, the feedback information of the first target channel is feedback information based on a Code Block Group (CBG). In a case that at least one ACK exists in the feedback information of multiple CBGs corresponding to the first target channel, the feedback information of the first DCI is ACK.

Optionally, as an embodiment, the feedback information of the first target channel includes feedback information of one downlink channel. The apparatus 500 further includes a determination module configured to use ACK or NACK of the downlink channel as the ACK of the first DCI; and/or in a case that the feedback information of the downlink channel has not been received, consider that the feedback information of the first DCI is NACK.

Optionally, as an embodiment, a beam of the first target channel, the feedback information of the first target channel or the second target channel satisfies one of the following 1) to 5): 1) a common beam indicated by the first signaling; 2) a common beam currently used; 3) after a second preset duration after the transmitting time of the first DCI, the first target channel, the feedback information of the first target channel or the second target channel uses a common beam indicated by the first DCI; 4) in a case that a time interval between the DCI scheduling the first target channel and the first DCI reaches a preset value, the first target channel or the feedback information of the first target channel uses a common beam indicated by the first DCI; 5) in a case that a time interval between the DCI scheduling the second target channel and the first DCI reaches a preset value, the second target channel uses a common beam indicated by the first DCI.

Optionally, as an embodiment, the second target channel includes a PUSCH, and the apparatus 500 further includes a determination module configured to determine the feedback information of the first signaling based on whether the PUSCH has been correctly received.

Optionally, as an embodiment, the second target channel includes a PUSCH, and the transmitting module 502 may be configured to transmit third DCI. The third DCI is used for determining, by the terminal, whether the apparatus 500 has received the feedback information of the first signaling.

Optionally, as an embodiment, in a case that an HARQ process number used by the third DCI when scheduling a second PUSCH is the same as an HARQ process number used when scheduling a first PUSCH, and the third DCI includes an unflipped New Data Indicator (NDI) field value, the terminal determines that the apparatus 500 has received the feedback information of the first signaling. The first PUSCH is the second target channel.

Optionally, as an embodiment, the first signaling includes first DCI, and the first DCI is further used for triggering an aperiodic Sounding Reference Signal (SRS). The target reference signal is the SRS.

Optionally, as an embodiment, the first signaling includes first DCI, and the first DCI does not trigger an aperiodic SRS. The target reference signal is the nearest SRS before or after the transmitting time of the first DCI; or the target reference signal is the nearest SRS triggered by DCI before or after the transmitting time of the first DCI.

Optionally, as an embodiment, the first signaling includes first DCI, and the first DCI does not trigger an aperiodic SRS. The target reference signal is an SRS at the nearest time after a third preset duration after the transmitting time of the first DCI.

Optionally, as an embodiment, the first signaling includes a first DCI; the target reference signal is the nearest SRS before or after the transmitting time of the first DCI. The SRS is a periodic or semi-persistent SRS.

Optionally, as an embodiment, the first signaling includes first DCI, the first DCI carries a trigger signaling, the trigger signaling is associated with a periodic or semi-persistent SRS, and the receiving module 504 may be configured to receive a first SRS based on the trigger signaling. The first SRS is the periodic or semi-persistent SRS, or the first SRS is different from the periodic or semi-persistent SRS. The target reference signal is the first SRS.

Optionally, as an embodiment, a target slot offset value of the first SRS is obtained based on at least one of: 1) a slot offset value of the periodic or semi-persistent SRS; 2) indication by the first signaling; or 3) configuration by a higher-layer parameter.

Optionally, as an embodiment, the receiving module 504 may be further configured to, in a case that the receiving time of the first SRS is different from the receiving time of the periodic or semi-persistent SRS, receive the periodic or semi-persistent SRS based on the transmitting time of the first DCI, the target slot offset value and the period of the periodic or semi-persistent SRS.

Optionally, as an embodiment, DCI triggering the target reference signal satisfies at least one of: an FDRA field being set to 0; or CRC being scrambled by a C-RNTI.

Optionally, as an embodiment, the purpose of the SRS is configured as one of: antenna switching, codebook purpose, non-codebook purpose and beam management.

Optionally, as an embodiment, in a case that a PUSCH is configured as a codebook, the SRS is for a codebook purpose; and/or in a case that a PUSCH is configured as a non-codebook, the SRS is for a non-codebook purpose.

Optionally, as an embodiment, a beam of the SRS satisfies at least one of: a beam configured for the SRS; a common beam indicated by the first signaling; or a common beam used for current transmission.

Optionally, as an embodiment, the apparatus 500 further includes a determination module configured to perform one of the following 1) to 6): 1) using any one of the feedback information of the first target channel, the second target channel and the target reference signal as the feedback information of the first signaling; 2) using the first transmitted one of the feedback information of the first target channel, the second target channel and the target reference signal as the feedback information of the first signaling; 3) using the first transmitted one of the feedback information of the first target channel, the second target channel and the target reference signal after a sixth preset duration after the transmitting time of the first signaling as the feedback information of the first signaling; 4) preferentially using the feedback information of the first target channel as the feedback information of the first signaling; 5) preferentially using the second target channel as the feedback information of the first signaling; 6) preferentially using the target reference signal as the feedback information of the first signaling.

Optionally, as an embodiment, the transmitting module 502 or the receiving module 504 may be further configured to transmit a channel or a reference signal through the common beam after the common beam takes effect.

Optionally, as an embodiment, transmitting a channel or a reference signal through the common beam after the common beam takes effect includes: in a case that the feedback information of the first signaling is ACK, transmitting at least one of the following 1) to 3) through the common beam after a fourth preset duration after receiving the feedback information of the first signaling: 1) the first signaling, 2) DCI other than the first signaling, and 3) an uplink channel carrying the feedback information of the first signaling.

Optionally, as an embodiment, transmitting at least one of the following 1) to 3) through the common beam after a fourth preset duration after receiving the feedback information of the first signaling includes: in a case that the feedback information includes a plurality of ACK/NACK of the first signaling, transmitting at least one of the following a) to c) through the common beam after a fourth preset duration after receiving the latest ACK: a) the first signaling, b) DCI other than the first signaling, and c) an uplink channel carrying the feedback information of the first signaling.

Optionally, as an embodiment, the plurality of first signalings indicate the same TCI state.

Optionally, as an embodiment, the fourth preset duration is predefined or configured by the apparatus 500, and the value of the fourth preset duration supports at least one of beam switching delay, antenna switching delay or antenna panel switching delay of the terminal.

Optionally, as an embodiment, a Path Loss Reference Signal (PL RS) of an uplink channel and the common beam take effect at the same time, and the PL RS is determined based on at least one of the following 1) to 4): 1) a downlink RS in the TCI state indicated by the first signaling; 2) a downlink RS associated with an RS in the TCI state indicated by the first signaling; 3) in a case that a source RS in the TCI state indicated by the first signaling is an SRS, the PL RS is a PL RS updated by MAC CE or a downlink RS associated with the SRS; 4) in a case that the TCI state indicated by the first signaling includes a TCI state for a downlink and a TCI state for an uplink, and the TCI state for the uplink includes an SRS, the PL RS is a downlink RS in the TCI state for the downlink or a PL RS updated by MAC CE.

Optionally, as an embodiment, the target reference signal includes an SRS, and the transmitting a channel or a reference signal through the common beam after the common beam takes effect includes at least one of the following 1) or 2): 1) transmitting the channel or the reference signal by using a current TCI state or the TCI state indicated by the first signaling between the receiving time of the SRS and a fifth preset duration; 2) transmitting the channel or the reference signal by using the TCI state indicated by the first signaling between after the fifth preset duration after the receiving time of the SRS.

For the apparatus 500 according to the embodiment of this application, refer to the process of the method 300 corresponding to the embodiment of this application. In addition, various units/modules and other operations and/or functions in the apparatus 500 are respectively designed to achieve the corresponding process in the method 300 and can achieve the same or equivalent technical effects, which will not be repeated here for the sake of simplicity.

Figure 6:
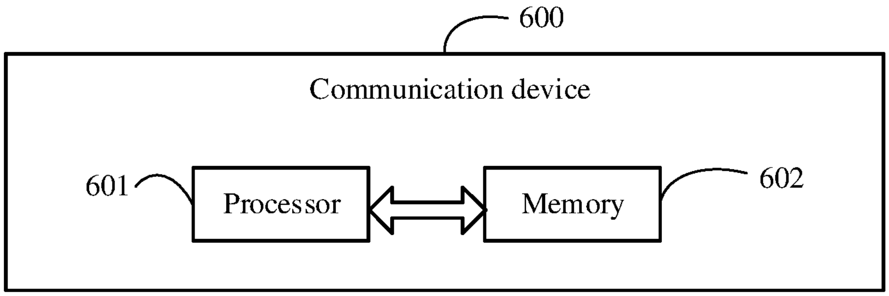
FIG. 6 is a structural schematic diagram of a communication device according to an embodiment of this application.

Optionally, referring to FIG. 6, an embodiment of this application further provides a communication device 600, which includes a processor 601, a memory 602 and a program or instruction stored in the memory 602 and executable on the processor 601. For example, in a case that the communication device 600 is a terminal, the program or instruction is executed by the processor 601 to implement the various processes in the beam indication method embodiments, and can achieve the same technical effect. In a case that the communication device 600 is a network side device, the program or instruction is executed by the processor 601 to implement the various processes in the beam indication method embodiments, and can achieve the same technical effect. To avoid repetition, it will not be repeated here.

Figure 7:
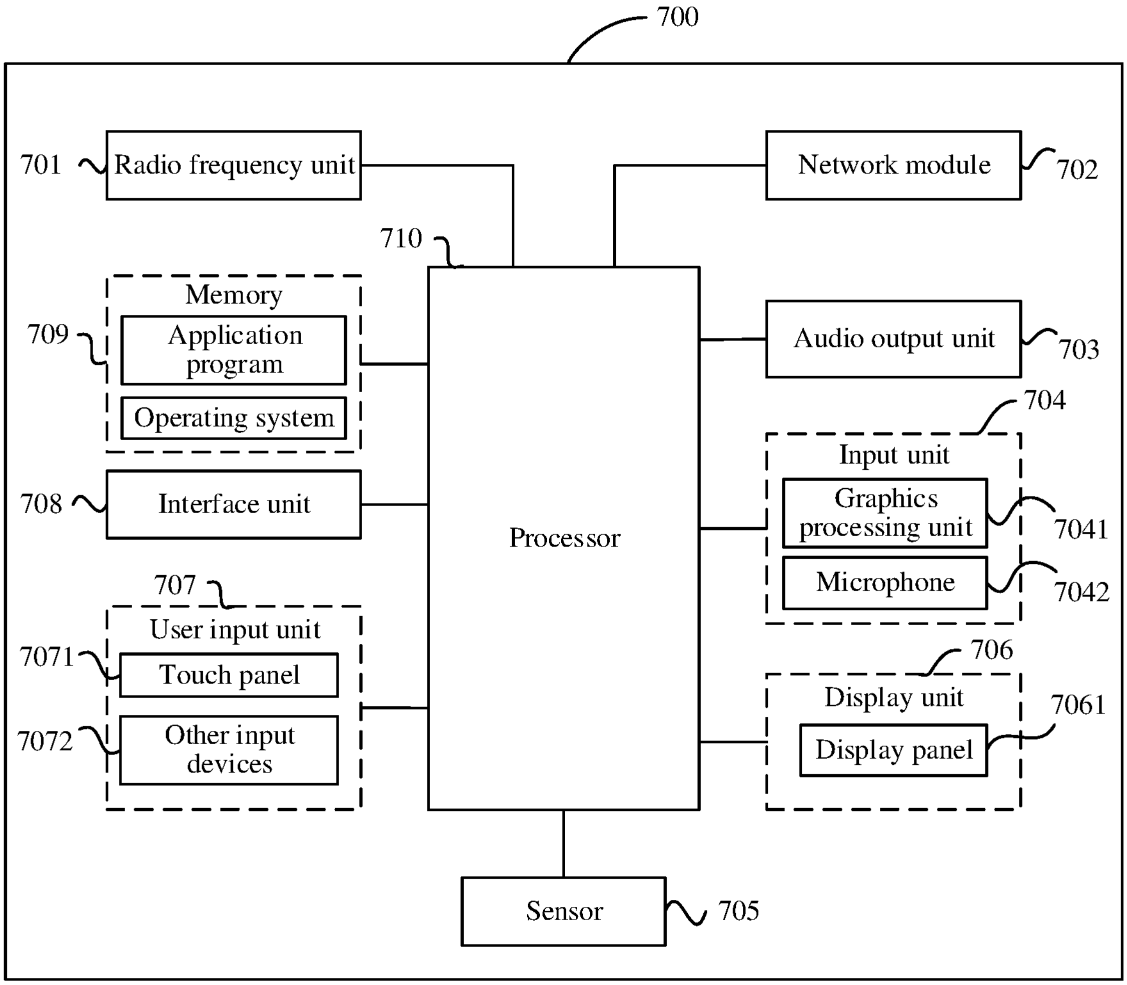
FIG. 7 is a structural schematic diagram of a terminal according to an embodiment of this application.

FIG. 7 is a hardware structural schematic diagram of a terminal according to an embodiment of this application.

The terminal 700 includes, but not limited to, a radio frequency unit 701, a network module 702, an audio output unit 703, an input unit 704, a sensor 705, a display unit 706, a user input unit 707, an interface unit 708, a memory 709, a processor 710, etc.

It is to be understood by those skilled in the art that the terminal 700 may further include a power supply (such as a battery) that supplies power to various components. The power supply may be logically connected to the processor 710 through a power management system, thus achieving functions such as charging, discharging and power consumption management through the power management system. The structure of the terminal illustrated in FIG. 7 does not constitute a limitation on the terminal. The terminal may include more or fewer components than illustrated therein, or may involve combination with certain components or different component arrangements, which will not be repeated here.

It is to be understood that in the embodiment of this application, the input unit 704 may include a Graphics Processing Unit (GPU) 7041 and a microphone 7042. The GPU 7041 processes image data of still images or videos obtained by an image capture device (such as a camera) in a video capture mode or image capture mode. The display unit 706 may include a display panel 7061, which may be configured in the form of liquid crystal display, organic light emitting diode, or the like. The user input unit 707 includes a touch panel 7071 and other input devices 7072. The touch panel 7071 is also called touch screen. The touch panel 7071 may include two parts, i.e., a touch detection device and a touch controller. The other input devices 7072 may include, but not limited to, physical keyboards, function keys (such as volume control keys and switch keys), trackballs, mice, and joysticks, which will not be repeated here.

In the embodiment of this application, the radio frequency unit 701 receives downlink data from the network side device and gives it to the processor 710 for processing; and transmits uplink data to the network side device. Typically, the radio frequency unit 701 includes, but not limited to, an antenna, at least one amplifier, a transceiver, a coupler, a low noise amplifier, a duplexer, etc.

The memory 709 may be configured to store software programs or instructions, as well as various data. The memory 709 may mainly include a program or instruction storage zone and a data storage zone. The program or instruction storage zone can store the operating system, application programs or instructions required for at least one function (such as sound playback function or image playback function), etc. In addition, the memory 709 may include a high-speed random access memory, and may further include a non-volatile memory. The non-volatile memory may be a Read-Only Memory (ROM), Programmable ROM (PROM), an Erasable PROM (EPROM), an Electrically EPROM (EEPROM), or a flash memory. For example, it includes at least one disc storage device, flash memory device, or other non-volatile solid-state storage device.

The processor 710 may include one or more processing units. Optionally, the processor 710 may integrate an application processor and a modulation and demodulation processor. The application processor mainly processes the operating system, user interface, and application programs or instructions. The modulation and demodulation processor mainly processes wireless communication, which is, for example, a baseband processor. It is to be understood that the modulation and demodulation processor may not be integrated into the processor 710.

The radio frequency unit 701 is configured to receive a first signaling, the first signaling being used for indicating a TCI state, the TCI state being used for indicating a common beam of at least two channels or reference signals; and transmit feedback information of the first signaling, the feedback information of the first signaling including one of:

feedback information of a first target channel, a second target channel and a target reference signal.

In the embodiment of this application, the network side device can indicate the common beam of at least two channels or reference signals through the first signaling, which can reduce signaling overhead compared to the method of indicating beams for these at least two channels or reference signals respectively. In addition, the embodiment of this application can use the feedback information of the first target channel, the second target channel or the target reference signal as the feedback information of the first signaling. The network side device can know whether the terminal has successfully received the first signaling in time, thus facilitating the subsequent transmission of the channels or reference signals through the common beam, and improving the communication efficiency.

The terminal 700 provided in the embodiment of this application can also implement the various processes in the beam indication method embodiments, and can achieve the same technical effect, which will not be repeated here to avoid repetition.

Figure 8:
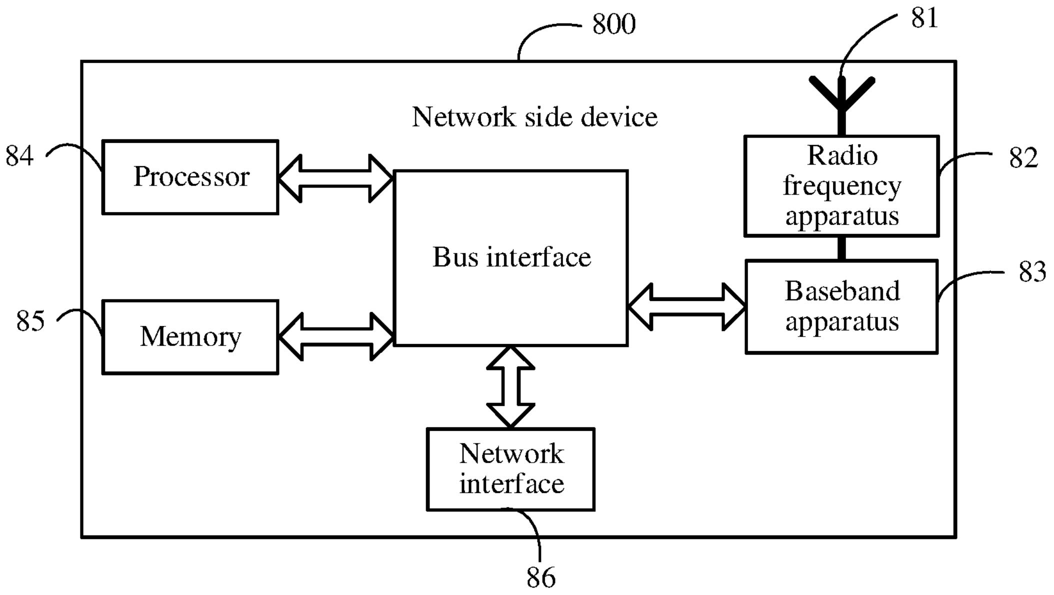
FIG. 8 is a structural schematic diagram of a network side device according to an embodiment of this application.

Optionally, an embodiment of this application further provides a network side device. Referring to FIG. 8, the network side device 800 includes an antenna 81, a radio frequency apparatus 82 and a baseband apparatus 83. The antenna 81 is connected with the radio frequency apparatus 82. In the uplink direction, the radio frequency apparatus 82 receives information through the antenna 81 and transmits the received information to the baseband apparatus 83 for processing. In the downlink direction, the baseband apparatus 83 processes information to be transmitted and transmits it to the radio frequency apparatus 82. The radio frequency apparatus 82 processes the received information and transmits it through the antenna 81.

The frequency band processing apparatus may be located in the baseband apparatus 83. The method executed by the network side device in the above embodiment can be implemented in the baseband apparatus 83. The baseband apparatus 83 includes a processor 84 and a memory 85.

The baseband apparatus 83 may include, for example, at least one baseband board. A plurality of chips are provided on the baseband board. Referring to FIG. 8, one chip, for example, is the processor 84 connected with the memory 85 and configured to call a program in the memory 85 and perform operations on the network side device illustrated in the method embodiment.

The baseband apparatus 83 may further include a network interface 86 configured to exchange information with the radio frequency apparatus 82. The interface is, for example, a Common Public Radio Interface (CPRI).

Optionally, the network side device according to the embodiment of this application further includes an instruction or program stored in the memory 85 and executable on the processor 84. The processor 84 calls the instruction or program in the memory 85 to execute the method executed by each module illustrated in FIG. 5, and achieves the same technical effect, which will not be repeated here to avoid repetition.

An embodiment of this application further provides a non-transitory readable storage medium. A program or instruction is stored in the non-transitory readable storage medium. The program or instruction, when executed by a processor, implements the various processes in the beam indication method embodiments, and can achieve the same technical effect, which will not be repeated here to avoid repetition.

The processor may be a processor in the terminal described in the above embodiment. The non-transitory readable storage medium includes a non-transitory computer-readable storage medium, such as a computer Read-Only Memory (ROM), a Random Access Memory (RAM), a magnetic disc or an optical disc.

An embodiment of this application further provides a chip. The chip includes a processor and a communication interface. The communication interface is coupled with the processor. The processor is configured to run a program or instruction to implement the various processes in the beam indication method embodiments, and can achieve the same technical effect, which will not be repeated here to avoid repetition.

It is to be understood that the chip mentioned in the embodiments of this application may also be called system level chip, system on a chip, chip system or system-on-chip.

An embodiment of this application provides a computer program product. The compute program product is stored in a non-transient storage medium. The computer program product is executed by at least one processor to implement the various processes in the beam indication method embodiments, and can achieve the same technical effect, which will not be repeated here to avoid repetition.

An embodiment of this application further provides a communication device, which is configured to perform the various processes in the beam indication method embodiments, and can achieve the same technical effect, which will not be repeated here to avoid repetition.

The terms "include", "comprise" or any other variation thereof are intended to cover non-exclusive inclusion, so that a process, method, item or device that includes a series of elements not only includes those elements, but also other elements that are not explicitly listed, or also include elements inherent in such a process, method, item or device. Without further limitations, the element limited by the statement 'including a . . . ' does not exclude the existence of another identical element in a process, method, item or device that includes that element. In addition, the scope of the methods and apparatuses in the embodiments of this application is not limited to performing functions in the order shown or discussed, but may also include performing functions in a substantially simultaneous manner or in the opposite order according to the involved functions. For example, the described methods may be executed in a different order from the described ones, and various steps may also be added, omitted or combined. In addition, features described with reference to certain examples may be combined in other examples.

Through the description of the above embodiments, those skilled in the art can clearly understand that the above embodiments may be implemented through software and necessary universal hardware platforms. Of course, they may also be implemented through hardware. However, in many cases, the former is better. Based on this understanding, the technical solution of this application, or the part that contributes to the existing technology, may be reflected in the form of a software product, which is stored in a non-transitory storage medium (such as ROM/RAM, magnetic disc or optical disc), including several instructions to enable a terminal (which may be a mobile phone, a computer, a server, an air conditioner or a network side device) to execute the methods described in the embodiments of this application.

The embodiments of this application have been described above with reference to the drawings. However, this application is not limited to the embodiments above. The embodiments above are only exemplary rather than restrictive. Under the inspiration of this application, those skilled in the art may make many variations without departing from the essence and the scope of protection of this application, which, however, still fall within the scope of protection of this application.

What is claimed is:

1. A beam indication method, comprising:

receiving, by a terminal, a media access control control element (MAC CE), the MAC CE indicating K groups of transmission configuration indicator (TCI) states, K being a positive integer, the TCI state being used for indicating a common beam of at least two channels or reference signals; and transmitting feedback information of the MAC CE, the feedback information of the MAC CE comprising feedback information of a first target channel.

2. The method according to claim 1, wherein the method further comprises: receiving configuration information, the configuration information being used for configuring a TCI state for an uplink and a TCI state for a downlink being joint or separate.

3. The method according to claim 1, wherein the method further comprises: determining that a target TCI state in each group of TCI states is used for an uplink or a downlink, or determining a transmitting receiving point (TRP) identifier corresponding to a target TCI state in each group of TCI states based on at least one of:

an arrangement order or position of the target TCI state;

a codepoint corresponding to the target TCI state being used for a downlink or an uplink;

a TRP identifier corresponding to the codepoint corresponding to the target TCI state; or a TCI state pool from which the target TCI state is selected.

4. The method according to claim 1, wherein the method further comprises:

transmitting a channel or a reference signal through the common beam after the common beam takes effect.

5. The method according to claim 4, wherein the transmitting a channel or a reference signal through the common beam after the common beam takes effect comprises:

in a case that the feedback information of the MAC CE is acknowledgment (ACK), transmitting at least one of the following through the common beam after a fourth preset duration after transmitting the feedback information of the MAC CE:

the MAC CE, downlink control information (DCI) other than the MAC CE, or an uplink channel carrying the feedback information of the MAC CE.

6. The method according to claim 5, wherein the fourth preset duration is configured by a network side device, and a value of the fourth preset duration supports at least one of beam switching delay, antenna switching delay or antenna panel switching delay of the terminal.

7. The method according to claim 4, wherein a path loss reference signal (PL RS) of an uplink channel and the common beam take effect at the same time, and the PL RS is determined based on a downlink RS in a TCI state indicated by the MAC CE.

8. A terminal comprising: a processor, a memory and a program or instruction stored in the memory and executable on the processor, wherein the program or instruction, when executed by the processor, causes the terminal to perform:

receiving a media access control control element (MAC CE), the MAC CE indicating K groups of transmission configuration indicator (TCI) states, K being a positive integer, the TCI state being used for indicating a common beam of at least two channels or reference signals; and transmitting feedback information of the MAC CE, the feedback information of the MAC CE comprising feedback information of a first target channel.

9. The terminal according to claim 8, wherein the program or instruction, when executed by the processor, causes the terminal to further perform: receiving configuration information, the configuration information being used for configuring a TCI state for an uplink and a TCI state for a downlink being joint or separate.

10. The terminal according to claim 8, wherein the program or instruction, when executed by the processor, causes the terminal to further perform: determining that a target TCI state in each group of TCI states is used for an uplink or a downlink, or determining a transmitting receiving point (TRP) identifier corresponding to a target TCI state in each group of TCI states based on at least one of:

an arrangement order or position of the target TCI state;

a codepoint corresponding to the target TCI state being used for a downlink or an uplink;

a TRP identifier corresponding to the codepoint corresponding to the target TCI state; or a TCI state pool from which the target TCI state is selected.

11. The terminal according to claim 8, wherein the program or instruction, when executed by the processor, causes the terminal to further perform:

transmitting a channel or a reference signal through the common beam after the common beam takes effect.

12. The terminal according to claim 11, wherein the program or instruction, when executed by the processor, causes the terminal to perform:

in a case that the feedback information of the MAC CE is acknowledgment (ACK), transmitting at least one of the following through the common beam after a fourth preset duration after transmitting the feedback information of the MAC CE:

the MAC CE, downlink control information (DCI) other than the MAC CE, or an uplink channel carrying the feedback information of the MAC CE.

13. The terminal according to claim 12, wherein the fourth preset duration is configured by a network side device, and a value of the fourth preset duration supports at least one of beam switching delay, antenna switching delay or antenna panel switching delay of the terminal.

14. The terminal according to claim 11, wherein a path loss reference signal (PL RS) of an uplink channel and the common beam take effect at the same time, and the PL RS is determined based on a downlink RS in a TCI state indicated by the MAC CE.

15. A non-transitory readable storage medium, storing a program or instruction, wherein the program or instruction, when executed by a processor of a terminal, causes the terminal to perform:

receiving a media access control control element (MAC CE), the MAC CE indicating K groups of transmission configuration indicator (TCI) states, K being a positive integer, the TCI state being used for indicating a common beam of at least two channels or reference signals; and transmitting feedback information of the MAC CE, the feedback information of the MAC CE comprising feedback information of a first target channel.

16. The non-transitory readable storage medium according to claim 15, wherein the program or instruction, when executed by the processor, causes the terminal to further perform:

receiving configuration information, the configuration information being used for configuring a TCI state for an uplink and a TCI state for a downlink being joint or separate.

17. The non-transitory readable storage medium according to claim 15, wherein the program or instruction, when executed by the processor, causes the terminal to further perform: determining that a target TCI state in each group of TCI states is used for an uplink or a downlink, or determining a transmitting receiving point (TRP) identifier corresponding to a target TCI state in each group of TCI states based on at least one of:

an arrangement order or position of the target TCI state;

a codepoint corresponding to the target TCI state being used for a downlink or an uplink;

a TRP identifier corresponding to the codepoint corresponding to the target TCI state; or a TCI state pool from which the target TCI state is selected.

18. The non-transitory readable storage medium according to claim 15, wherein the program or instruction, when executed by the processor, causes the terminal to further perform:

transmitting a channel or a reference signal through the common beam after the common beam takes effect.

19. The non-transitory readable storage medium according to claim 18, wherein the program or instruction, when executed by the processor, causes the terminal to perform:

in a case that the feedback information of the MAC CE is acknowledgment (ACK), transmitting at least one of the following through the common beam after a fourth preset duration after transmitting the feedback information of the MAC CE:

the MAC CE, downlink control information (DCI) other than the MAC CE, or an uplink channel carrying the feedback information of the MAC CE.

20. The non-transitory readable storage medium according to claim 19, wherein the fourth preset duration is configured by a network side device, and a value of the fourth preset duration supports at least one of beam switching delay, antenna switching delay or antenna panel switching delay of the terminal.

* * * * *